3,152,104
NOVEL PHOSPHINE AND PROCESS OF
PREPARATION
Robert Rabinowitz, Stamford, Conn., and Ruth Weintraub Marcus, New York, N.Y., assignors to American Cyanamid Company, New York, N.Y., a corporation of Maine
No Drawing. Filed Mar. 9, 1961, Ser. No. 94,418
6 Claims. (Cl. 260—80)

This invention relates to a novel polymerizable phosphine. More particularly, it relates to p-styryldiphenylphosphine and to novel methods for its preparation. Still more particularly, the invention is concerned with polymerized, flame-resistant, p-styryldiphenylphosphine.

The polymerizable compound of the instant invention can be represented by the formula:

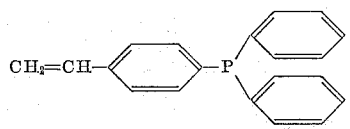

It is a white crystalline solid having a melting point of from 77° C. to 78° C. The novel styryldiphenylphosphine is soluble in organic hydrocarbon solvents, such as benzene, petroleum ether and hexane.

Unexpectedly, the polymerizable compound can be conveniently prepared in a direct manner from a p-styrylmagnesium halide Grignard reagent and a diphenylhalophosphine. Resultant monomeric p-styryldiphenylphosphine is obtained in good yield and purity. Thus-formed polymerizable phosphine compound can be readily converted to polymers which may be cast as films, molded or otherwise conventionally shaped to form useful products. Advantageously, these products possess highly desirable fire-resistant and retarding properties.

Although organic reactions involving Grignard reagents are well known, not all such reactions can be successfully practiced to prepare monomeric compounds. Thus, it has been found that where, for instance, p-styrylmagnesium chloride and dimethyldichlorosilane are reacted, an attempt to isolate a polymerifiable monomeric product from the reaction mixture is unsuccessful. An analysis of the product so obtained indicates polymer formation. Expected monomer cannot be detected or recovered. Hence, it is surprising to find that p-styrylmagnesium chloride and diphenylchlorophosphine, for example, can be reacted to obtain the corresponding monomer, p-styryldiphenylphosphine, in good yield and purity.

In general, the Grignard reagent employed in the process of the present invention is prepared by heating equimolar quantities of magnesium and a p-halostyrene, such as p-chloro-, or bromo- or iodostyrene at temperatures above about 35° C. but not exceeding about 60° C. The reaction is carried out in an inert solvent, such as tetrahydrofuran. Resultant styrylmagnesium halide and a diphenylhalophosphine as, for instance, the corresponding chloro, bromo or iodo derivative thereof, are next reacted at temperatures between about —40° C. and 60° C. In practice, either the diphenylhalophosphine is added directly to the Grignard reagent or conversely the Grignard reagent is added to the diphenylhalophosphine. Monomeric p-styryldiphenylphosphine is thus obtained. It is a preferred practice to react the chloro derivatives of the respective reactants at temperatures between about —10° C. and 20° C. by adding p-styrylmagnesium chloride to diphenylchlorophosphine, for the reasons that the aforementioned reactants are commercially available and good yields of desired monomer are readily obtained.

The quantity of reactants can be widely varied. Equimolar quantities of a styrylmagnesium halide and a diphenylhalophosphine, for instance, are usually utilized although an excess of either reactant may be employed. For economy of operation and optimum results yieldwise, 1 mol of diphenylhalophosphine and from 1 to 1.1 mols of p-styrylmagnesium halide, respectively, can be used.

Advantageously, the order of addition of reactants is not of critical moment. In general, it is preferred to add the Grignard reagent, i.e., the styrylmagnesium halide to the diphenylhalophosphine reactant, rather than vice versa. In this manner, markedly improved yields of monomer are obtained. It has been further observed that the use of temperatures below about 10° C. is particularly advantageous in obtaining monomer in optimum yields.

The invention will be illustrated in conjunction with the following examples which are to be taken as illustrative only and not by way of limitation. All parts are by weight, unless otherwise noted.

*Example 1*

The Grignard reagent, p-styrylmagnesiumchloride, is prepared by admixing 9.7 parts of magnesium, 3 parts by volume of ethyl bromide, 27.6 parts of p-chlorostyrene and 50 parts by volume of tetrahydrofuran in a suitable reaction vessel while maintaining the contents therein at about 55° C. for about sixty minutes in order to insure complete reaction. The contents containing resultant Grignard, p-styrylmagnesiumchloride, are slowly added to a solution of 31.5 parts of diphenylchlorophosphine in 150 parts by volume of tetrahydrofuran, employing external cooling to prevent the temperature from exceeding about 55° C. t-Butyl catechol (0.5 part) is then added to the reaction mixture which is poured into a suitable separatory funnel containing 200 parts of cooled water, maintained at about 15° C., and 33 parts of ammonium chloride. Two layers form. The tetrahydrofuran layer is separated from the aqueous layer. To the latter are next added 100 parts by volume of tetrahydrofuran to extract organic soluble components remaining in the aqueous layer. Again the second formed tetrahydrofuran layer is removed from the aqueous layer and this organic layer is combined with the first formed tetrahydrofuran layer. The latter is next dried over magnesium sulfate and then concentrated to a total volume of 100 parts. Resultant mixture is added to 1000 parts of hexane. A small quantity of precipitate, insoluble in the hexane-tetrahydrofuran mixture and believed to be polymer, results. It is filtered off and resultant hexane-tetrahydrofuran reaction mixture is distilled under about 25 mm. Hg pressure to remove solvent therefrom. To the residue is next added ethanol (95%), whereupon desired p-styryldiphenylphosphine precipitates and is filtered off, whereby a 50 percent yield is obtained. On recrystallization from ethanol, the melting point of the recovered monomer is 77° C. to 78° C. and has the following analysis.

Calculated for $C_{20}H_{17}P$: C, 83.31; H, 5.94; P, 10.74.
Found: C, 82.63; H, 6.12; P, 11.06.

*Example 2*

Example 1 is repeated in every material detail except that the diphenylchlorophosphine reactant is added directly to the Grignard reagent in that order. Desired p-styryldiphenylphosphine is obtained in a 24 percent yield.

*Example 3*

To show the effect of Grignard preparation under reflux temperatures, the following illustrative example is presented.

The procedure of Example 2 is repeated in every material respect, except that the initial step involving the preparation of the Grignard reagent is carried out under reflux conditions, namely, at a temperature of about 72°

C. No polymerizable monomer can be subsequently recovered or detected.

*Example 4*

The corresponding bromo derivative of the Grignard reagent of Example 1 and the corresponding diphenylbromophosphine are reacted in substantially the same manner as set forth in Example 1 above. Desired product, p-styryldiphenylphosphine, as identified in Example 1, is obtained in good yield.

*Example 5*

As in Example 1 above, the Grignard reagent is prepared employing 3.5 parts by volume of ethyl bromide, 58.2 parts of magnesium, 163.6 parts of p-chlorostyrene and 300 parts by volume of tetrahydrofuran. After further dilution with additional 100 parts of tetrahydrofuran, this mixture is added to a solution of 224 parts of diphenylchlorophosphine and 800 parts by volume of tetrahydrofuran. The temperature is maintained at between 0° C. and 10° C. during the latter addition and when completed, the contents of the reaction vessel are allowed to warm to room temperature. Desired p-styryldiphenylphosphine compound, recovered as in Example 1 above, is obtained in 80 percent yield. Upon analysis, the data recorded correspond to that of Example 1 above.

Similar results are obtained when the iodo derivatives of each reactant are employed as in this example.

*Example 6*

The homopolymerization of p-styryldiphenylphosphine is illustrated.

Into a suitable glass tube is added a solution of 1 part of p-styryldiphenylphosphine and 0.0057 part of azobisisobutyronitrile in 2 parts of benzene and degassed several times at −78° C. The tube is then sealed and heated to 60° C. An increase in viscosity of the tube contents is noted after three hours.

Resultant viscous solution is then removed and added to hexane. Homopolymer precipitates and is found to possess an intrinsic viscosity of 0.28 in toluene at 30° C. The solution is cast on a glass surface and then stripped therefrom. The film has excellent flame-resistant properties as indicated by the following test.

Samples of polystyrene powder and poly-p-styryldiphenylphosphine are heated in separate test tubes until they melt and flow assuming the shape of the bottom of the test tubes. These tubes are cooled, broken and the molded samples removed. When brought into direct contact with the flame of a match, the polystyrene mold burns whereas the poly-p-styryldiphenylphosphine merely softens in the absence of burning.

*Example 7*

Copolymerization of p-styryldiphenylphosphine and styrene is accomplished as in Example 6 above by adding to a glass tube mixture containing 1.85 parts of p-styryldiphenylphosphine, 1.77 parts of styrene, 0.007 parts of azobisisobutyronitrile and 2 parts of benzene. Heating the tube contents for 30 minutes, a white amorphous polymer analyzing 6.9% P, is obtained having flame-resistant properties.

Similarly, a copolymer of methylmethacrylate and p-styryl-diphenylphosphine having flame-resistant properties is obtained when 140 parts of p-styryl-diphenylphosphine and 2.50 parts of methylmethacrylate are reacted in the process outlined in this example. The copolymer analyzes 2.6% P.

We claim:

1. Monomeric p-styryldiphenylphosphine.
2. A process for the preparation of p-styryldiphenylphosphine which comprises the steps of: reacting at least equimolar quantities of (1) a Grignard reagent, prepared by reacting a p-halostyrene with magnesium at temperatures not in excess of 60° C. to obtain the corresponding, p-styrylmagnesium halide, and (2) a diphenylhalophosphine at temperatures between about −40° C. and about 60° C., and recovering p-styryldiphenylphosphine in good yield and purity.
3. A process according to claim 2, wherein the p-halostyrene and the diphenylhalophosphine reactants are p-chlorostyrene and diphenylchlorophosphine, respectively.
4. The process according to claim 2, wherein the Grignard reagent is added to the diphenylchlorophosphine reactant in that order.
5. The process according to claim 4, wherein the Grignard reagent and the diphenylchlorophosphine reactant are brought into reactive combination at temperatures between about −10° C. and 20° C.
6. Polymeric p-styryldiphenylphosphine, having good flame-resistant properties.

References Cited in the file of this patent

UNITED STATES PATENTS 3,010,998    Garner _____ Nov. 28, 1961

OTHER REFERENCES

Schildknecht: Vinyl and Other Related Polymers, John Wiley and Sons, 1959, page 8 relied on.

Senear et al.: "Derivates of Triphenylphosphine and Triphenylphosphine Oxide," Journal of Organic Chemistry, November 1960, pp. 20001–20006.